United States Patent
Dou et al.

(10) Patent No.: US 12,435,676 B1
(45) Date of Patent: Oct. 7, 2025

(54) DUAL-FUEL ENGINE SYSTEMS FOR WORK VEHICLE

(71) Applicant: Deere & Company, Moline, IL (US)

(72) Inventors: Danan Dou, Cedar Falls, IA (US); Craig W. Lohmann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/796,035

(22) Filed: Aug. 6, 2024

(51) Int. Cl.
*F02D 19/06* (2006.01)
*F02D 19/12* (2006.01)

(52) U.S. Cl.
CPC .......... *F02D 19/12* (2013.01); *F02D 19/0649* (2013.01)

(58) Field of Classification Search
CPC .. F02D 41/3094; F02D 41/30; F02D 41/3827; F02D 2200/10; F02D 2200/602; F02D 2200/60; F02D 2200/50; F02D 41/345; F02D 19/08; F02D 19/12; F02D 19/0639; F02D 19/0613; F02D 19/061; F02D 19/0602; F02B 47/02
See application file for complete search history.

(56) References Cited

U.S. PATENT DOCUMENTS

| | | |
|---|---|---|
| 3,266,234 A | 8/1966 | Cook |
| 4,561,253 A | 12/1985 | Curtil |
| 5,203,830 A | 4/1993 | Faletti et al. |
| 6,276,334 B1 | 8/2001 | Flynn et al. |
| 6,321,699 B1 | 11/2001 | Britton |
| 6,601,563 B2 | 8/2003 | Funke et al. |
| 7,004,125 B2 | 2/2006 | Asada |
| 7,152,559 B2 | 12/2006 | Kuo et al. |
| 7,228,839 B2 | 6/2007 | Kuo et al. |
| 7,347,171 B2 | 3/2008 | Leman et al. |
| 7,628,013 B2 | 12/2009 | Aikawa et al. |
| 7,765,994 B2 | 8/2010 | Winstead |

(Continued)

FOREIGN PATENT DOCUMENTS

| | | | |
|---|---|---|---|
| BR | 102023023482 A2 * | 7/2024 | ............. F02B 37/10 |
| CN | 1079533 A | 12/1993 | |

(Continued)

OTHER PUBLICATIONS

AVL—IWIS—Dual Mode VCS TM at httpswww.youtube.comwatchv=cAlb7wJ0Uk8, dated Sep. 11, 2017. (1 page).

(Continued)

*Primary Examiner* — Lindsay M Low
*Assistant Examiner* — Teuta B Holbrook
(74) *Attorney, Agent, or Firm* — KLINTWORTH & ROZENBLAT LLP

(57) ABSTRACT

A dual-fuel engine system for a work vehicle includes an engine with a piston-cylinder arrangement defining a combustion chamber and an engine control unit (ECU). The ECU has a processing and memory architecture configured to execute instructions to deliver to the engine only a first fuel when an operating load of the engine is less than 5 a first predetermined threshold, deliver only a second fuel and operate the engine stoichiometrically when the operating load is greater than a second predetermined threshold. The second predetermined threshold is greater than the first predetermined threshold.

18 Claims, 5 Drawing Sheets

(56) References Cited

U.S. PATENT DOCUMENTS

| | | |
|---|---|---|
| 8,150,582 B2 | 4/2012 | Blommer et al. |
| 8,406,956 B2 | 3/2013 | Wey et al. |
| 8,474,258 B2 | 7/2013 | Mahakul et al. |
| 8,522,756 B2 | 9/2013 | Vuk et al. |
| 8,590,517 B2 | 11/2013 | Yokoo et al. |
| 8,930,118 B2 | 1/2015 | Nagatsu et al. |
| 9,316,180 B2 | 4/2016 | Heiermann |
| 9,512,814 B2 | 12/2016 | Yamakawa et al. |
| 9,835,065 B2 | 12/2017 | Jozsa et al. |
| 9,845,109 B2 | 12/2017 | George et al. |
| 9,903,262 B2 | 2/2018 | Edwards et al. |
| 10,487,753 B2 | 11/2019 | Idicheria et al. |
| 10,648,443 B1 | 5/2020 | Inoue et al. |
| 10,704,436 B2 | 7/2020 | Jozsa et al. |
| 10,801,430 B2 | 10/2020 | McCarthy, Jr. et al. |
| 11,199,162 B2 | 12/2021 | McCarthy, Jr. et al. |
| 11,305,813 B2 | 4/2022 | Kim |
| 11,536,213 B2 | 12/2022 | Miles et al. |
| 11,572,673 B2 | 2/2023 | Dou et al. |
| 11,572,824 B2 | 2/2023 | Miles et al. |
| 11,635,039 B1 | 4/2023 | Dou et al. |
| 11,795,869 B2 | 10/2023 | Lohmann et al. |
| 12,018,626 B1 | 6/2024 | Miles et al. |
| 12,024,247 B2 | 7/2024 | Schäfer |
| 12,044,187 B2 | 7/2024 | DeVries et al. |
| 2003/0200942 A1 | 10/2003 | Dachtchenko et al. |
| 2004/0045283 A1 | 3/2004 | Asada |
| 2005/0252464 A1 | 11/2005 | Aikawa et al. |
| 2006/0016417 A1 | 1/2006 | Kuo et al. |
| 2006/0016420 A1 | 1/2006 | Kuo et al. |
| 2006/0086560 A1 | 4/2006 | Furusho et al. |
| 2007/0119422 A1* | 5/2007 | Lewis ............... F02M 25/10 |
| | | 123/295 |
| 2007/0204747 A1 | 9/2007 | Aoyama et al. |
| 2007/0295290 A1 | 12/2007 | Cao |
| 2007/0295316 A1 | 12/2007 | Davis et al. |
| 2008/0288157 A1 | 11/2008 | Winsor et al. |
| 2010/0211264 A1 | 8/2010 | Wey et al. |
| 2010/0268422 A1 | 10/2010 | Blommer et al. |
| 2011/0247584 A1 | 10/2011 | Gentile |
| 2011/0315128 A1 | 12/2011 | Yokoo et al. |
| 2013/0019828 A1 | 1/2013 | Nagatsu et al. |
| 2013/0047958 A1 | 2/2013 | Yamakawa et al. |
| 2013/0180485 A1 | 7/2013 | Kamio |
| 2015/0040560 A1 | 2/2015 | Jozsa et al. |
| 2015/0300284 A1* | 10/2015 | Ishida ............... F02B 25/04 |
| | | 123/300 |
| 2015/0330315 A1 | 11/2015 | Takahashi et al. |
| 2015/0354437 A1 | 12/2015 | Mulye |
| 2016/0010576 A1 | 1/2016 | Primus et al. |
| 2016/0280251 A1 | 9/2016 | George et al. |
| 2017/0101941 A1 | 4/2017 | Gladel et al. |
| 2018/0009443 A1 | 1/2018 | Norstad |
| 2018/0058285 A1 | 3/2018 | Jozsa et al. |
| 2018/0106204 A1 | 4/2018 | McCarthy, Jr. et al. |
| 2018/0306098 A1 | 10/2018 | Edwards et al. |
| 2018/0347476 A1 | 12/2018 | Idicheria et al. |
| 2019/0040826 A1 | 2/2019 | McCarthy, Jr. et al. |
| 2019/0048812 A1* | 2/2019 | Lundgren ............ F02D 19/061 |
| 2019/0389509 A1 | 12/2019 | Kim |
| 2020/0088081 A1 | 3/2020 | Rohde et al. |
| 2021/0054777 A1 | 2/2021 | Blumreiter et al. |
| 2021/0179168 A1 | 6/2021 | Zeiler |
| 2022/0003184 A1 | 1/2022 | Blumreiter et al. |
| 2022/0003318 A1 | 1/2022 | Brushkivskyy et al. |
| 2022/0018297 A1 | 1/2022 | Blumreiter et al. |
| 2022/0034284 A1 | 2/2022 | Klingbeil |
| 2022/0048563 A1 | 2/2022 | Schäfer |
| 2023/0160350 A1 | 5/2023 | Klingbeil |
| 2024/0067261 A1 | 2/2024 | Kim |
| 2024/0140525 A1 | 5/2024 | Maruyama et al. |
| 2024/0141824 A1 | 5/2024 | Lohmann |
| 2024/0141844 A1 | 5/2024 | Lohmann |
| 2024/0209805 A1 | 6/2024 | DeVries et al. |
| 2024/0209806 A1 | 6/2024 | DeVries et al. |

FOREIGN PATENT DOCUMENTS

| | | | | |
|---|---|---|---|---|
| CN | 101023250 A | 8/2007 | | |
| CN | 101198771 A | 6/2008 | | |
| CN | 101495729 A | 7/2009 | | |
| CN | 100567714 C | 12/2009 | | |
| CN | 101198771 B | 6/2010 | | |
| CN | 101900637 A | 12/2010 | | |
| CN | 102312731 A | 1/2012 | | |
| CN | 101363378 B | 7/2012 | | |
| CN | 102884300 A | 1/2013 | | |
| CN | 103026032 A | 4/2013 | | |
| CN | 102884300 B | 7/2015 | | |
| CN | 103026032 B | 8/2015 | | |
| CN | 105683535 A | * | 6/2016 | ......... F02D 41/1498 |
| CN | 106004994 A | 10/2016 | | |
| CN | 106321269 A | 1/2017 | | |
| CN | 106004994 B | 7/2018 | | |
| CN | 108778900 A | 11/2018 | | |
| CN | 105408607 B | * | 3/2019 | ............... F02B 3/06 |
| CN | 107499373 B | 3/2020 | | |
| CN | 112368470 A | 2/2021 | | |
| CN | 108291494 B | 3/2021 | | |
| CN | 108474308 B | 11/2021 | | |
| CN | 111365133 B | * | 3/2022 | ............... F02B 1/12 |
| CN | 112368470 B | 3/2023 | | |
| CN | 116811995 A | 9/2023 | | |
| CN | 119226660 A | 12/2024 | | |
| DE | 112008001007 T5 | 2/2010 | | |
| DE | 112008001087 T5 | 7/2010 | | |
| DE | 102011105530 A1 | 3/2012 | | |
| DE | 102010064182 A1 | * | 6/2012 | ......... F02D 41/0025 |
| DE | 102011015696 A1 | 10/2012 | | |
| DE | 112011101517 T5 | 5/2013 | | |
| DE | 102011105530 B4 | 11/2015 | | |
| DE | 112008001087 B4 | 6/2016 | | |
| DE | 102015206837 A1 | 10/2016 | | |
| DE | 102015221809 A1 | 4/2017 | | |
| DE | 102016203027 A1 | * | 8/2017 | |
| DE | 112015007102 T5 | 8/2018 | | |
| DE | 102016105498 B4 | 6/2020 | | |
| DE | 112011101517 B4 | 4/2021 | | |
| DE | 102020119860 A1 | 2/2022 | | |
| DE | 102021208165 A1 | 2/2022 | | |
| DE | 112015007102 B4 | 7/2022 | | |
| DE | 102021208165 B4 | 5/2024 | | |
| DE | 102023128286 A1 | 5/2024 | | |
| EP | 2564047 B1 | 3/2016 | | |
| FR | 2918704 A3 | 1/2009 | | |
| FR | 2944056 A1 | * | 10/2010 | ......... F02D 19/0692 |
| JP | 2006161799 A | * | 6/2006 | ............ F02D 37/02 |
| JP | 2008025534 A | 2/2008 | | |
| JP | 2008223537 A | 9/2008 | | |
| JP | 2011214477 A | 10/2011 | | |
| JP | 5299586 B2 | 9/2013 | | |
| JP | 5569100 B2 | 8/2014 | | |
| JP | 5902289 B2 | 4/2016 | | |
| JP | 2017078337 A | 4/2017 | | |
| JP | 6634774 B2 | 1/2020 | | |
| KR | 20180041195 A | * | 8/2018 | |
| KR | 102354453 B1 | * | 1/2022 | |
| WO | WO9324749 A1 | 12/1993 | | |
| WO | WO2006022998 A2 | 3/2006 | | |
| WO | WO2006023040 A1 | 3/2006 | | |
| WO | WO2009024170 A1 | 2/2009 | | |
| WO | WO2011122014 A1 | 10/2011 | | |
| WO | WO2011135859 A1 | 11/2011 | | |
| WO | WO-2016020160 A1 | * | 2/2016 | ......... F02D 41/0027 |
| WO | WO2017095411 A1 | 6/2017 | | |
| WO | WO2017127585 A1 | 7/2017 | | |
| WO | WO-2018221511 A1 | * | 12/2018 | ............ F01N 3/101 |
| WO | WO2020007456 A1 | 1/2020 | | |
| WO | WO2020232287 A1 | 11/2020 | | |

(56) References Cited

FOREIGN PATENT DOCUMENTS

| WO | WO2021174016 A1 | 9/2021 |
|---|---|---|
| WO | WO2022011275 A1 | 1/2022 |

OTHER PUBLICATIONS

Clearflame—ClearFlame Engine Technologies Overview at httpswww.youtube, dated May 18, 2020. (1 page).

Clearflame—SAE Chicago Presents: ClearFlame Engine Technologies at httpswww.youtube. comwatchv=fAIMtoIU2B8, dated Mar. 2021. (1 page).

FEV—VCR Conrod Coupled Simulation at httpswww.youtube.comwatchv=30sEeZ54X_s, dated May 23, 2017. (1 Page).

FEV—Explore FEV's VCR Conrod at httpswww.youtube.comwatchv=ABNZY3Enykg, dated Apr. 24, 2015. (1 page).

Wikipedia—Glow plug (diesel engine) at https://en.wikipedia.org/wiki/Glow_plug_(diesel_engine), undated, admitted prior art. (2 pages).

Nissan—Nissan VC Turbo Engine (Variable Compression Turbo) at https://www.youtube.com/watch?v=YPDXgAWhrs4, dated Mar. 30, 2018. (4 pages).

USPTO Non-Final Office Action issued in U.S. Appl. No. 18/177,514 dated Jun. 27, 2023.

USPTO Final Office Action issued in U.S. Appl. No. 18/177,514 dated Dec. 1, 2023.

USPTO Non-Final Office Action issued in U.S. Appl. No. 18/145,536 dated Dec. 19, 2023.

USPTO Non-Final Office Action issued in U.S. Appl. No. 17/977,016 dated Feb. 16, 2024.

USPTO Non-Final Office Action issued in U.S. Appl. No. 18/462,313 dated Feb. 28, 2024.

USPTO Non-Final Office Action issued in U.S. Appl. No. 18/145,524 dated Mar. 13, 2024.

U.S. Department of Energy: Energy Efficiency & Renewable Energy (EERE), Alternative Fuels Data Center, Flexible Fuel Vehicles, https://afdc.energy.gov/vehicles/flexible-fuel, Apr. 7, 2024.

John Deere: "Future Farming, John Deere presents ethanol engine at Agritechnica", https://www.futurefarming.com/tech-in-focus/john-deere-presents-ethanol-engine-at-agritechnica/, Oct. 30, 2023.

Ethanol Producer Magazine: "Vale, Komatsu and Cummins announce collaboration to develop Dual Fuel large trucks, powered by ethanol and diesel", https://ethanolproducer.com/articles/vale-komatsu-and-cummins-announce-collaboration-to-develop-dual-fuel-large-trucks-powered-by-ethanol-and-diesel/, Jul. 16, 2024 by Vale.

MAN Energy Solutions: "Methanol-ready four-stroke engines", https://www.man-es.com/marine/products/four-stroke-engines/methanol-ready-engines/, Dec. 10, 2023.

ClearFlame Engine Technologies: Diesel Engine Aftertreatment, "Our Technology, Reduce emissions and lower your cost of ownership with ClearFlame's clean engine technology", https://clearflame.com/technology/, Sep. 26, 2022.

SAE International: Heavy-Duty Diesel Sustainable Transport Symposium, Application of Westport Fuel Systems' HPDI Technology to a Demonstration Truck, Gothenburg, Sweden, (Westport Fuel Systems), https://www.sae.org/attend/heavy-duty-sustainable-transport-symposium, May 3-4, 2023.

Cummins Inc.: "Dual Fuel Engines for Drilling" (Natural Gas), https://www.cummins.com/engines/drilling/dual-fuel-engines-drilling, Sep. 18, 2018.

U.S. Department of Energy: CURAN, Scott et al., Oak Ridge National Laboratory (ORNL), "Ammonia for 4-stroke Marine Dual Fuel and Gas Engines (Retrofits and New)", DOE Vehicle Technologies Office Annual Merit Review, Project ID: DORMA046, Jun. 2024.

SAE International WCX 2024, (Miles, Paul): Year-in-Review on Emissions, Fuels, and Propulsion Engines for Heavy-Duty and Off-Road Applications, Sandia National Laboratories Combustion Research Facility, Livermore, CA, SAE WCX Apr. 16-18, 2024.

\* cited by examiner

DUAL-FUEL ENGINE SYSTEMS FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to internal combustion engine systems for work vehicles and a dual-fuel engine system for work vehicles.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. Internal combustion engines that combust petroleum-based fuels (e.g., gasoline and diesel) have been used to generate power necessary to drive such propulsion systems and drive trains. However, engine system that combust non-petroleum based fuels are becoming of interest as such fuels may be produced from renewable sources and/or combustion of such fuels may generate fewer hazardous gases that have to be processed and/or emitted from the work vehicle.

SUMMARY OF THE DISCLOSURE

The disclosure provides a dual-fuel engine system for a work vehicle that includes an engine with a piston-cylinder arrangement defining a combustion chamber and an engine control unit (ECU). The ECU has a processing and memory architecture configured execute instructions to deliver to the engine only a first fuel when an operating load of the engine is less than a first predetermined threshold and deliver only a second fuel and operate the engine stoichiometrically when the operating load is greater than a second predetermined threshold. The second predetermined threshold is greater than the first predetermined threshold. The dual-fuel engine system also includes an aftertreatment device disposed in an exhaust flow path between the engine and an exhaust vent, wherein the exhaust flow path is free of any injected catalytic reductant.

The present disclosure also provides an engine control unit (ECU) for a work vehicle having a dual-fuel engine system. The dual-fuel engine system has an engine comprising a piston-cylinder arrangement defining a combustion chamber and an aftertreatment device disposed in an exhaust flow path between the engine and an exhaust vent of the work vehicle. The ECU includes a controller having a processing and memory architecture configured to execute instructions according to an operating load of the engine to deliver to the engine only a first fuel when the operating load is less than a first predetermined threshold, deliver to the engine only a second fuel and operate the engine stoichiometrically when the operating load is greater than a second predetermined threshold. The second predetermined threshold is greater than the first predetermined threshold. The exhaust flow path is free of any injected catalytic reductant.

In some aspects or embodiments, the ECU delivers a combination of both the first fuel and the second fuel when the operating load is between the first predetermined threshold and the second predetermined threshold.

In some aspects or embodiments, the engine is a compression ignition engine.

In some aspects or embodiments, the aftertreatment system comprises one or both of a three-way catalyst and a particulate filter. Further, in some cases the exhaust flow path is free of a selective catalytic reduction device.

In some aspects or embodiments, the dual-fuel engine system includes fuel-injector assemblies and the ECU selectively operates the fuel injector assemblies to deliver only the first fuel, the second fuel, or both the first and the second fuels to the engine. In some further aspects or embodiments, when the operating load is greater than the second predetermined threshold, the ECU operates a fluid injection device to add a non-combustible fluid to the second fuel and operates the fuel injector assemblies to deliver a mixture of the non-combustible fluid and the second fuel to the combustion chambers of the engine. In still further aspects and embodiments, the non-combustible fluid comprises water.

In some aspects or embodiments, the first fuel is one of biodiesel, renewable diesel, dimethyl ether, (diethyl) ether, or fossil diesel.

In some aspects or embodiments, the second fuel is an alcohol or an alcohol diluted with water.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
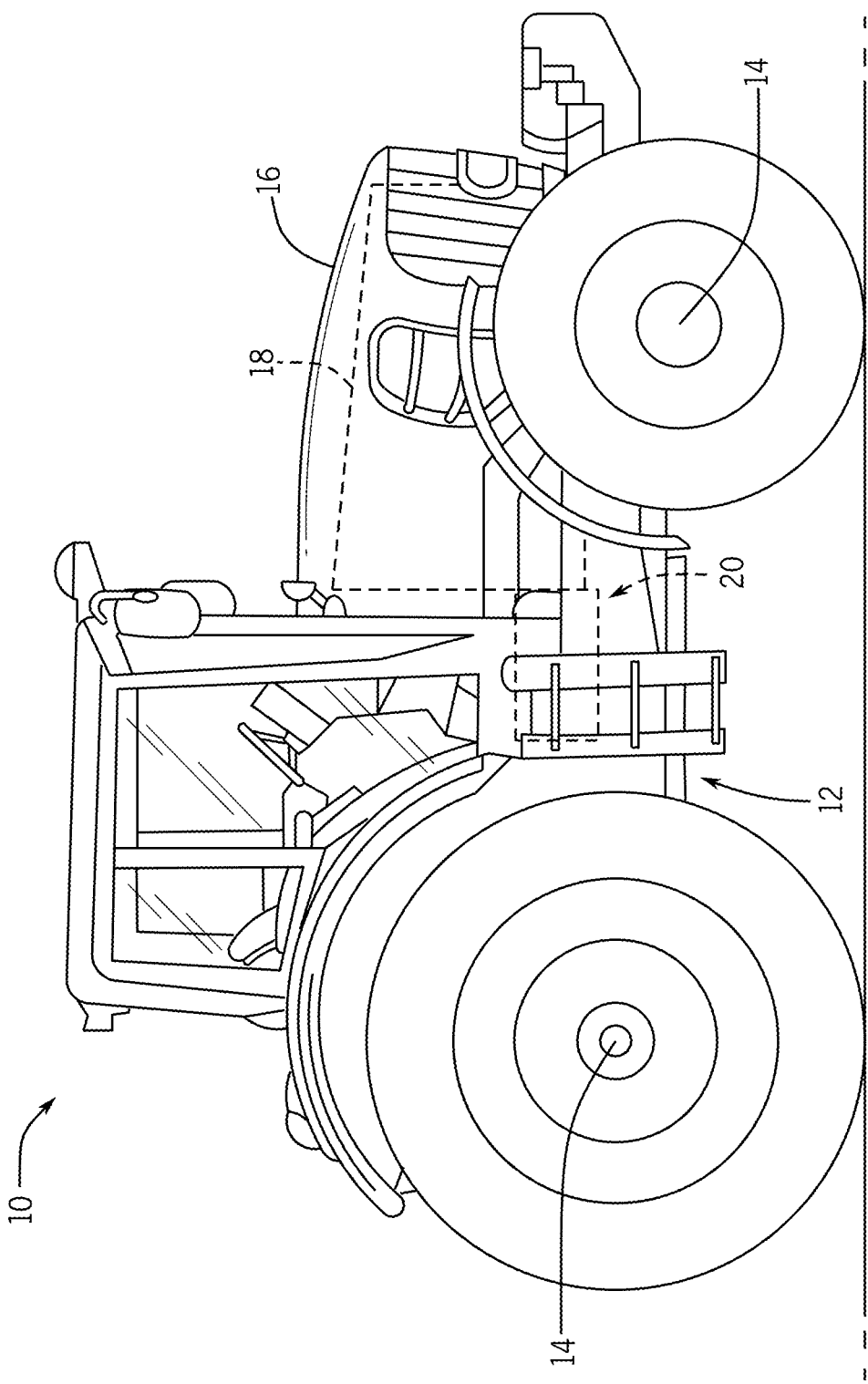
FIG. 1 is an example work vehicle in the form of an agricultural tractor in which the dual-fuel engine system of the present disclosure may be incorporated.

The following describes one or more example embodiments of the disclosed dual-fuel engine system for a work vehicle as shown in the accompanying figures of the drawings described briefly above. Various modifications to the example embodiments may be contemplated by one of skill in the art. Discussion herein focuses on the dual-fuel engine system being for a work vehicle, such as an agricultural tractor, but the dual-fuel engine system disclosed herein may be utilized in other contexts, including other work vehicle platforms in the agriculture, construction, forestry, mining, and other industries.

Overview

A cetane value of a fuel is a number between 0 and 100 that is an indicator of the propensity of the fuel to autoignite under compression. Typical compression engine systems include engines that combust fuels that have relatively high cetane numbers, for example, at least 45, including biodiesel, renewable diesel, dimethyl ether, (diethyl) ether, or fossil diesel. Some of these fuels are petroleum based and thus are not produced from readily renewable sources. Further, exhaust gases generated from combustion of these fuels may include particulate matter and hazardous gases that must be treated using a complex aftertreatment system before the treated exhaust gases can be emitted from the work vehicle.

In contrast, alcohol based fuels may be produced from renewable sources and/or combustion of these fuels results in exhaust gases that are substantially free of particulate matter and comprise gases that may be treated by an aftertreatment system that is simpler than that used to treat exhaust gases generated by combustion of conventional fuels. However, alcohol based fuels have relatively low cetane values of, for example, less than 10 or even less than 5 and do not readily autoignite from compression alone. In some embodiments, such alcohol based fuels include undiluted alcohols such as, for example, ethanol, methanol, and the like. In other embodiments, the alcohol based fuels may be an alcohol diluted with water and such fuel may comprise, for example, 93% ethanol and 7% water (i.e., E93), 93% methanol and 7% water (i.e., M93), and the like.

A dual-fuel engine system for a work vehicle is disclosed herein that has a compression engine and an engine control unit (ECU). The ECU monitors an operating load of the engine and delivers to combustion chambers of the engine only a first fuel having a high-cetane value (hereafter, "high-cetane fuel"), only a second fuel having a low-cetane value (hereafter, "low-cetane fuel"), or a combination thereof for combustion. In particular, the ECU causes the engine to operate in a high-cetane fuel mode when the engine is initially ignited or is functioning with a low operating load. When the engine is operated in the high-cetane fuel mode, the ECU operates fuel injector assemblies associated with combustion chambers of the engine to deliver to the combustion chamber with only the first fuel. Once the operating load of the engine has reached at least a first predetermined threshold level, the ECU operates the engine in a dual-fuel mode by causing the fuel injector assemblies to deliver both the first fuel and the second fuel to the combustion chambers of the engine. When supplied with both the first fuel and the second fuel, compression in each combustion chamber causes the first fuel therein to autoignite and combust, which in turn generates heat that ignites the second fuel in the combustion chamber so that the second fuel combusts. Combustion of the first and second fuels in this manner generates additional thermal energy that further heats the combustion chamber. Only a relatively small amount of the first fuel sufficient to ignite the second fuel is supplied to the combustion chamber when the engine is operating in the dual-fuel mode and the engine produces power from combustion of the second fuel. Further, in some embodiments, a ratio of an amount of the first fuel relative to an amount of the second fuel supplied to the engine when the engine is operating in the dual-fuel mode may be reduced as the operating load of the engine increases.

After the operating load of the engine reaches at least a second predetermined threshold, operation of the engine transitions to a low-cetane fuel mode in which the ECU operates the fuel injector assembly to deliver only the second fuel for combustion. In particular, the combustion chambers (and other components) of the engine have heated sufficiently when the operating load of the engine is at least the second predetermined threshold. The second fuel is warmed sufficiently by heat from the engine components when such fuel is delivered to the combustion chambers so that compression of the heated second fuel causes the second fuel to ignite and combust.

In some embodiments, the first fuel and the second fuel are delivered to the combustion chambers in a liquid state and then vaporize. In some cases, the second fuel may be a fuel that has a high heat of vaporization and vaporization of such fuel after injection facilitates cooling of the combustion chamber and thereby prevents thermal overloading of the engine when the engine is operated in the dual-fuel mode and the low-cetane fuel mode. Such cooling in turn reduces the likelihood of knock or pre-detonation of the fuel(s) and also prevents damage to the engine components from thermal overloading of the engine and/or pre-detonation. Further, because the second fuel promotes cooling of the engine, a larger quantity of the second fuel may be combusted during each power cycle of the engine relative to a quantity of the first fuel that would be combusted in a conventional engine system (e.g., a diesel fuel only engine system). Thus, combustion of the second fuel may generate power comparable to that produced by such conventional engine systems. Furthermore, the cooling effects of combusting the second fuel may allow the ECU to supply a stoichiometric mixture of air and the second fuel to the combustion chamber, which causes combustion of substantially all of the second fuel to produce power. During operation in the dual-fuel mode and the low-cetane fuel mode, the ECU may monitor one or more sensors in an exhaust flow path from the engine to determine an amount of oxygen in the exhaust gases to confirm the engine is operating stoichiometrically (or near stoichiometrically). If excess oxygen is detected in the exhaust gases (i.e., the engine is not operating stoichiometrically), the ECU may cause a richer mixture of the second fuel and air to be supplied to the engine by operating the fuel injector assemblies, an air intake throttle, and other components of the dual-fuel engine system apparent to one who has ordinary skill in the art.

In some embodiments, the ECU monitors the engine temperature and determines if the temperature of the engine has increased to a level that the cooling effects of combusting only the second fuel may not prevent overheating the engine. In such cases, the ECU may operate a fluid injection device to introduce a non-combustible fluid (such as water) into the second fuel so that both the non-combustible fluid and the second fuel are injected into the combustion chamber. Thereafter, the non-combustible fluid vaporizes in the combustion chamber and facilitates cooling of the engine. In some cases, the ECU may also mix the air drawn into the dual-fuel engine system with chilled recirculated exhaust gases to cool the drawn air before such air is delivered to the engine, which also facilitates cooling of the engine.

In some embodiments, the fuel injector assembly may include a dual-fuel injector unit that may be operated to selectively supply one or both the first and the second fuels to the combustion chamber. In other embodiments, the fuel injector assembly may include two single-fuel injector units, one operable to supply the first fuel and the other operable to supply the second fuel.

As discussed above, engine systems that burn fuels having only a high-cetane value may require excess air and a complex aftertreatment system including, for example, a selective catalytic reduction device, a diesel exhaust fluid injector, and an ammonia oxidation catalyst, and the like to treat the exhaust gases generated by combustion of such fuels before being emitted from the work vehicle. In contrast, exhaust gases generated from combustion of the dual-fuel engine system disclosed herein may be treated by a particulate filter and/or a flow through three-way catalyst, an integrated three-way catalyst and particulate filter device, and the like. Also, the temperature of the exhaust gases generated by dual-fuel engine system may regularly exceed 600 degrees Celsius, which is sufficient to burn off soot that may accumulate on the particulate filter of the aftertreatment system. Thus, the dual-fuel engine system disclosed herein may not require active soot regeneration processes/systems used in a conventional diesel engine system.

These and further aspects of the disclosed dual-fuel engine system will be better understood with regard to the one or more examples described hereinafter.

Example Dual-Fuel Engine System

Referring to FIG. 1, a work vehicle 10 is shown that can implement embodiments of the present disclosure. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle platforms. The work vehicle 10 includes a frame or chassis 12 carried on front and rear wheels 14. Positioned on a forward end region of the chassis 12 is an engine housing 16 within which is located a dual-fuel engine system 18. The dual-fuel engine system 18 provides power via an associated powertrain 20 to an output member (e.g., an output shaft, not shown) that, in turn, transmits power to axle(s) of the work vehicle 10 to provide propulsion thereto and/or to a power take-off shaft for powering an implement (not shown) on or associated with the work vehicle 10.

Figure 2:
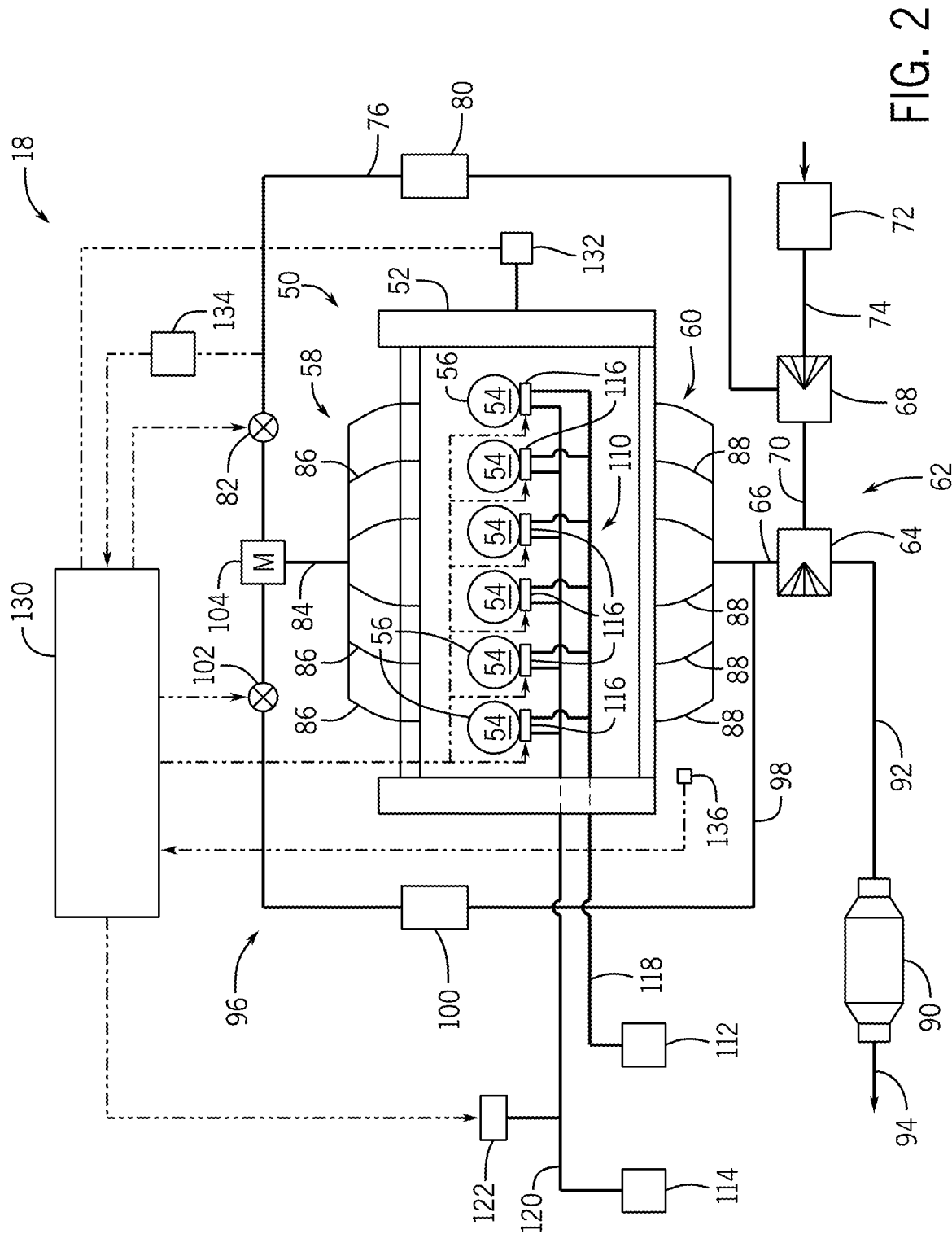
FIG. 2 is a schematic diagram of an example dual-fuel engine system of the work vehicle of FIG. 1.

The dual-fuel engine system 18 is illustrated in greater detail in FIG. 2 in accordance with an example implementation. Referring to FIG. 2, the dual-fuel engine system 18 includes an internal combustion engine 50 (hereafter, "engine") that, in the present embodiment is a compression-ignition internal combustion engine. The engine 50 of the dual-fuel engine system 18 includes an engine block 52 having a plurality of piston-cylinder arrangements 54 that define corresponding combustion chambers 56. The plurality of piston-cylinder arrangements 54 operate to cause combustion events within the combustion chamber 56 and thereby generate power necessary to operate the work vehicle 10. In the illustrated implementation, the engine 50 is an inline-6 (I-6) engine defining six piston-cylinder arrangements 54; however, in alternative implementations various engine styles and layouts may be used.

The dual-fuel engine system 18 also includes an intake manifold 58 fluidly connected to the engine 50, an exhaust manifold 60 fluidly connected to the engine 50, and a turbocharger assembly 62. The turbocharger assembly 62 includes a turbine 64 fluidly connected to the exhaust manifold 60 by an exhaust gas passageway 66 and a compressor 68 mechanically coupled to the turbine 64 via a rotatable shaft 70. The compressor 68 is fluidly connected to an air intake 72 that may include one or more intake components (e.g., an air filter, an air cooler, etc.) disposed in an air intake passageway 74. During operation of the engine 50, exhaust gases generated by the engine 50 pass through the exhaust gas passageway 66 and through the turbine 64 to cause the turbine 64 (and the rotatable shaft 70) to rotate. Rotation of the rotatable shaft 70 in turn causes the compressor 68 to rotate and draw fresh air through the air intake 72, through the air intake passageway 74, through the compressor 68, and into the intake manifold 58 via a charge air passageway 76. Operation of the turbocharger assembly 62 in this manner increases the flow rate of air into the intake manifold 58 above what it would otherwise be without the turbocharger assembly 62 and thus the turbocharger assembly 62 supplies so-called "charge" air to the engine 50. In some embodiments, a charge air cooler (i.e., an aftercooler) 80 is disposed in the charge air passageway 76 to cool the charge air. The charge air cooler 80 reduces the temperature of the charge air to increase the unit mass per unit volume (i.e., density) of the charge air prior to such charge air being provided to the engine 50 for improved volumetric efficiency thereof. An air intake throttle 82 is also disposed in the charge air passageway 76 and regulates a rate at which charge air is supplied to the intake manifold 58. The compressed charged air allowed to flow through the air intake throttle 82 flows through a main intake 84 of the intake manifold 58.

The main intake 84 of the intake manifold 58 is coupled to a plurality of secondary pipes 86 of the intake manifold 58 and each of the secondary pipes 86 is in fluid communication with a corresponding combustion chamber 56 to direct a supply of charge air thereto.

The exhaust manifold 60 of the dual-fuel engine system 18 includes a plurality of secondary pipes 88, each of which is in fluid communication with a corresponding combustion chamber 56. The plurality of secondary pipes 88 direct the exhaust gases generated by the engine 50 to the exhaust gas passageway 66 of the exhaust manifold 60. As described above, the exhaust gas passageway 66 of the exhaust manifold 60 is fluidly coupled to and causes rotation of the turbine 64 of the turbocharger assembly 62 and thereby causes more ambient air to be drawn into the air intake passageway 74.

A first portion of the exhaust gases in the exhaust gas passageway 66 then exits the turbine 64 and into an aftertreatment system 90 via an aftertreatment passageway 92. The aftertreatment system 90 treats the exhaust gases prior to the treated exhaust gases being vented to the ambient environment via an exhaust outlet or exhaust vent 94 of the work vehicle 10. A second portion of the exhaust gases in the exhaust gas passageway 66 may be directed to an exhaust recirculation (EGR) system 96 that includes an EGR passageway 98, an EGR cooler 100 disposed in the EGR passageway 98, and an EGR valve 102. Operation of the EGR valve 102 draws the second portion of the exhaust gases from the exhaust gas passageway 66 through the EGR passageway 98, through the EGR cooler 100, through the EGR valve 102, and into a mixer 104. Operation of the EGR valve 102 may be varied to determine the second portion of the of the exhaust gases in the exhaust gas passageway 66 that is drawn into the EGR system 96. The EGR cooler 100 cools the exhaust gases that flow through the EGR passageway 98 before such gases are supplied to the mixer 104. The second portion of the exhaust gases and the charge air drawn through the air intake passageway 74 combine in the mixer 104 before flowing into the main intake 84 of the intake manifold 58. The EGR system 96 functions to recirculate a portion of the exhaust gases generated by the engine 50 and thereby reduce the formation of oxides of nitrogen (NOx) during combustion and to regulate the temperature of the engine components, as necessary.

The dual-fuel engine system 18 includes a fuel supply system 110 that includes a first fuel source 112 having a first fuel (e.g., a high-cetane fuel) stored therein and a second fuel source 114 having a second fuel (e.g., a low-cetane fuel) stored therein. The first fuel source 112 and the second fuel source 114 are coupled to fuel injector assemblies 116 via a first fuel supply line 118 and a second fuel supply line 120, respectively. Each fuel injector assembly 116 is operable to selectively inject only the first fuel, only the second fuel, or both fuels simultaneously or sequentially into the combustion chamber 56 associated with the fuel injector assembly 116. In addition, the fuel supply system 110 includes a non-combustible fluid injector 122 that is operable to inject a quantity of a non-combustible fluid into the second fuel in the second fuel supply line 120, a mixture of the non-combustible fluid and the second fuel flows into the fuel injector assemblies 116, and such mixture is then injected into combustion chambers 56. The non-combustible fluid is a fluid such as, for example, water, that has high evaporative heat absorption, is free of foreign materials, and does not generate solid particles upon evaporation thereof. Further, such fluid should not negatively interfere with the operation of the engine 50 and/or function and durability of the components of the aftertreatment system 90.

Figure 3:
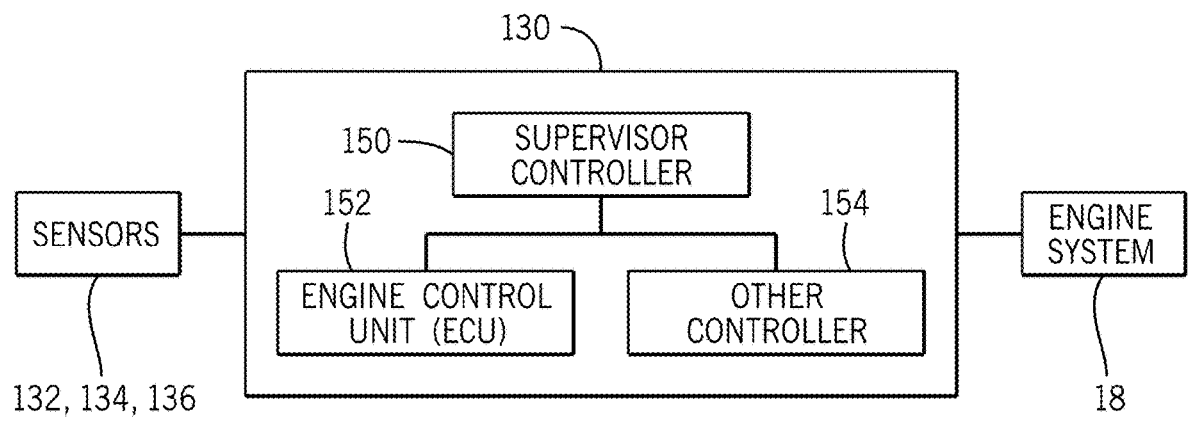
FIG. 3 is a block diagram of a control system of the dual-fuel engine system of FIG. 2.

Referring to FIGS. 2 and 3, the dual-fuel engine system 18 includes a control system 130 and various sensors including: an engine speed sensor 132; one or more air intake sensor(s) 134 disposed in the intake manifold 58 and/or the air intake 72 that measure one or more of mass airflow, air temperature, and air pressure in the intake manifold 58 and/or the air intake 72; and one or more exhaust sensor(s) 136 disposed in the exhaust manifold 60, the exhaust gas passageway 66, the aftertreatment system 90, and/or the aftertreatment passageway 92 that measures any or all of an oxygen level, temperature, and pressure of exhaust gases generated by the engine 50.

The control system 130 monitors signals or data received from the sensors 132, 134, and 136 described above and adjusts operation of the dual-fuel engine system 18 to ensure the work vehicle 10 is able to meet the demands placed on the work vehicle 10 by an operator. In particular, the control system 130 includes a supervisory controller 150, an electronic control unit (ECU) 152 that optimizes operation of the engine 50, and one or more additional controller(s) 154 such as an operator interface controller, a climate control system, a traction system controller, an accessory and/or hydraulic system controller, a work implement controller, and various others.

The supervisory controller 150 initiates operation of the ECU 152 and the additional controllers 154 when the work vehicle 10 is started by the operator (e.g., when the operator of the work vehicle 10 actuates an ignition of the work vehicle 10), monitors operation of such controllers 152 and 154 during operation of the work vehicle 10, and directs such controllers 152 and 154 to shut down when the operator turns off the work vehicle 10. The supervisory controller 150, the ECU 152, and the additional controllers 154 exchange signals and/or data therebetween as necessary to maintain efficient and clean operation of the dual-fuel engine system 18 (and thereby the work vehicle 10).

Figure 3A:
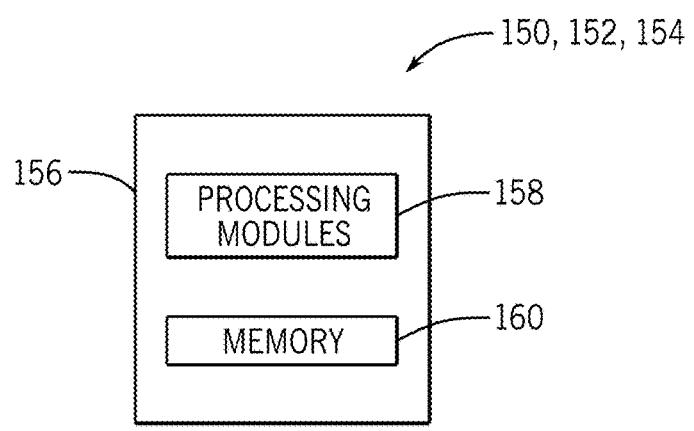
FIG. 3A is a block diagram of a computer-based device that may implement the components of the control system of FIG. 3.

Referring also to FIG. 3A, the supervisory controller 150, the ECU 152, and the additional controllers 154 may be implemented using hardware, software, firmware, or combinations thereof. In the illustrated embodiment, such components 150, 152, and 154 of the control system 130 may be implemented by one or more suitably programmed computer-based device(s) 156, some or each having one or more processing device(s) 158 and one or more memory device(s) 160. The one or more memory device(s) 160 has stored therein, among other things, programming instructions executed by the one or more processing device(s) 158 to cause the controllers 150, 152, and 154 to undertake functions of the dual-fuel engine system 18 as described herein.

Each computer-based device 156 may comprise, e.g., a computer, a device using one or more application specific integrated circuits (ASIC's) and/or field-programmable gate arrays (FPGA's), and/or combinations thereof. Such device 156 may be unitary or may be distributed multiple computing devices, and one or more such computing devices may be installed locally on or remote from the work vehicle 10. Each computer-based device 156 may communicate with another computing device over one or more network(s) such as a local area network (LAN), a control area network (CAN), a cellular network, a wide area network (WAN) such as the Internet, and the like. One or more components 150, 152, and 154 of the control system 130 also may be coupled to and responsive to one or more user device(s) (not shown) such as a keyboard, a mouse, a display, a touchscreen, a joystick, etc. via which an operator may monitor and direct operation of the work vehicle 10.

Referring once again to FIGS. 2 and 3, when the engine 50 is initially ignited, the ECU 152 starts to monitor signals/data provided by the engine speed sensor 132 regarding the operating speed of the engine 50; signals/data provided by one or more air intake sensors 134 regarding the characteristics of the charge air provided to the engine 50 such as the mass airflow, the temperature and pressure of such air, and the like; and signals/data provided by the exhaust sensors 136 to determine characteristics of the exhaust gases generated by operation of the engine 50 including, for example, the NOx, oxygen, fuel, water, etc. present in the exhaust gases, the temperature of such exhaust gases, and the like. The ECU 152 develops an estimate of an operating load of the engine 50 in accordance with the engine speed, the characteristics of the charge air supplied to the engine 50, and the characteristics of the exhaust gases generated by the engine 50.

In some embodiments, the operating load of the engine 50 is determined in accordance with an amount of fuel the engine 50 combusts to supply sufficient power to operate the work vehicle 10 as desired by the operator. The engine 50 passively reacts to changes in power requirements of the work vehicle 10. An all speed governor controls the engine to operate the engine 50 at a predetermined speed (i.e., revolutions-per-minute or RPM). When the power requirement of the work vehicle 10 increases, the engine RPM reduces temporarily. The ECU 152 monitors the signals/data provided by the engine speed sensor 132 to determine that the RPM of the engine 50 has dropped below the predetermined speed and in response causes additional fuel to be supplied to the engine 50 to restore the engine RPM to the predetermined speed. Combustion of the additional fuel in the engine 50 causes the exhaust flow rate and temperature to increase, which causes more air to be drawn into the engine 50.

The ECU 152 has stored in the memory thereof predetermined maps or control modes of engine torque and fuel requirements and associated with each such control mode is a desired air-fuel ratio, amount of exhaust gas recirculated by the EGR system 96, injection timing of each operating point of the engine 50, and the like. Each control mode may be associated with a corresponding operating load of the engine 50 and, further specifies whether the ECU 152 causes only the first fuel, both the first and the second fuels, or only the second fuel to be delivered to the engine 50 for combustion. Further, each control mode specifies an air-fuel ratio necessary to cause the engine 50 to operate at stoichiometry after the engine is initially ignited.

If the ECU 152 determines that the engine 50 has just been ignited from a cold state or the operating load of the engine 50 estimated by the ECU 152 is less than a first predetermined threshold that is associated with a low operating load, the ECU 152 operates the engine 50 in a high-cetane fuel mode and operates the fuel injector assembly 116 to deliver only the first fuel (i.e., high-cetane fuel) from the first fuel source 112 via the first fuel supply line 118 to the combustion chambers 56. If the operating load of the engine 50 estimated by the ECU 152 is greater than the first predetermined threshold but is less than a second predetermined threshold that indicates the engine 50 is not sufficiently warmed to cause autoignition of the second fuel (i.e., the low-cetane fuel), the ECU 152 causes the engine 50 to operate in a dual-fuel mode. Specifically, the ECU 152 operates each fuel injector assembly 116 to deliver both the first fuel (e.g., the high-cetane fuel) from the first fuel source 112 via the first fuel supply line 118 and the second fuel (i.e., the low cetane fuel) from the second fuel source 114 via the second fuel supply line 120 to the combustion chamber 56 associated with the fuel injector assembly 116. The amount of the first fuel delivered to the combustion chamber 56 when the engine 50 is operated in the dual-fuel mode is relatively small compared to the amount of second fuel delivered to the combustion chamber 56 and is an amount that is sufficient to autoignite when compressed and thereby generate heat that ignites the second fuel. Further, in some embodiments, the ECU 152 decreases the amount of the first fuel supplied relative to the amount of the second fuel as the operating load of the engine 50 increases. After the operating load of the engine 50 exceeds the second predetermined threshold, the ECU 152 operates the engine 50 in a low cetane fuel mode in which the ECU 152 causes the fuel injector assembly 116 to supply only the second fuel from the second fuel source 114 via the second fuel supply line 120 to the combustion chamber 56 associated therewith. Further, the ECU 152 adjusts the amount of charge air and fuel supplied to the engine 50 when the engine 50 is operating in the low cetane fuel mode so that substantially all of the fuel supplied to the combustion chamber 56 is combusted, i.e., the ECU 152 causes the engine 50 to operate stoichiometrically, while the engine 50 supplies sufficient power to operate the work vehicle 10 as desired by the operator. The ECU 152 continues to monitor the engine speed, characteristics of the charge air, and the characteristics of exhaust gases in accordance with signals/data generated by the sensors 132, 134, and 136 to monitor the operating load of the engine 50 and adjusts the operating mode of the engine 50 accordingly.

The ECU 152 also monitors the temperature of the exhaust gases to determine if the engine 50 is at risk of overheating which may result in damage to engine components and/or result in inefficient operation of the engine 50 if such temperature is sustained. In some cases, the ECU 152 actuates the non-combustible fluid injector 122 to introduce the non-combustible fluid into the second fuel supply line 120 if the ECU 152 determines the temperature of the engine 50 indicates the engine 50 is at risk of overheating. Such introduction of the non-combustible fluid into the second fuel supply line 120 causes the fuel injector assemblies 116 to deliver a mixture of the second fuel and the non-combustible fluid into the combustion chamber 56 corresponding thereto. The non-combustible fluid vaporizes in the combustion chamber 56 and thereby facilitates cooling of the combustion chamber 56 in addition to the cooling caused by vaporization of the second fuel. Further, the ECU 152 may increase the amount of cooled recirculated exhaust gases from the EGR system 96 that is mixed with the charge air to reduce the temperature of the charge air, which further reduces the operating temperature of the engine 50.

The dual-fuel engine system 18 disclosed herein does not suffer from cold-start drawbacks of engines that combust alcohol based fuels only because the high-cetane fuel is used when the engine 50 is initially ignited and until the engine 50 can support combustion of the low-cetane fuel alone or in combination with a small amount of high-cetane fuel. In addition, compression ratios comparable to those associated with modern diesel engines (e.g., greater than 16 and even greater than 20) may be used when the engine 50 is operated in the dual-fuel mode or low-cetane fuel mode, thus improving the power generation efficiency of the engine 50. In some embodiments, the ECU 152 may supply an air-fuel mixture to the engine 50 after the engine 50 is ignited so that the engine 50 is operated only stoichiometrically in the high-cetane fuel mode, dual-fuel mode, and the low-cetane fuel mode.

As would be apparent to one having ordinary skill in the art, power output of a conventional diesel-only engine may be limited when operated stoichiometrically due to a thermal limit of the engine. In the embodiments disclosed herein, the high-cetane fuel is only used when the engine 50 is operating at a low load and thus the engine 50 may be operated stoichiometrically without exceeding such thermal limits. Further, when the engine 50 is supplied with the low-cetane fuel, the engine 50 may be operated stoichiometrically, to produce more power, and/or with a high compression ratio to improve fuel efficiency without exceeding the thermal limit of the engine because of the evaporative cooling provided by the low-cetane fuel.

As described above, the aftertreatment system 90 of the dual-fuel engine system 18 may be include emission control devices that are simpler than those used with a conventional lean burn engine that combusts high-cetane fuel exclusively because the engine 50 of the dual-fuel engine system 18 combusts high-cetane fuels only for a short period of time when the engine 50 is cold or uses a small quantity of high-cetane fuel as an igniter of low-cetane fuel. Further, operation of the engine 50 with a stoichiometric air-fuel mixture generates exhaust gases with sufficient heat that facilitates activation of a three-way catalyst, little or no residual oxygen and/or fuel that may interfere with effectiveness of the three-way catalyst, and the like. Different combinations of emission control devices such as catalyst devices and particulate filters may be used in the aftertreatment system 90 in accordance with the types of high-cetane and low-cetane fuels that are used.

Figure 4:
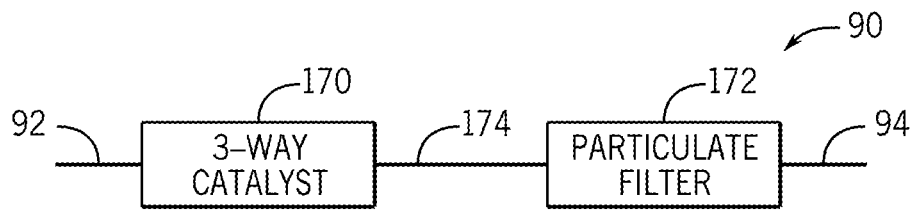
FIGS. 4 and 4A-4C are a block diagrams of alternative configurations of an aftertreatment system of the dual-fuel engine system of FIG. 2.

FIGS. 4 and 4A-4C show different configurations of the aftertreatment system 90 that may be used in embodiments of the dual-fuel engine system 18 disclosed herein. FIG. 4 shows a configuration of the aftertreatment system 90 in which exhaust gases in the aftertreatment passageway 92 are first directed through a three-way catalyst 170, then through a particulate filter 172 coupled to the three-way catalyst 170 by an aftertreatment flow line 174, and then vented through the exhaust vent 94. The three-way catalyst 170 converts hydrocarbons, carbon monoxide, and NOx in the exhaust gases into less harmful gases and the particulate filter 172 traps particulate matter such as soot present in the exhaust gases. The particulate filter 172 may be, for example, a three-way wall flow filter, a bare wall flow filter, a diesel particulate filter, and the like.

Figure 4A:
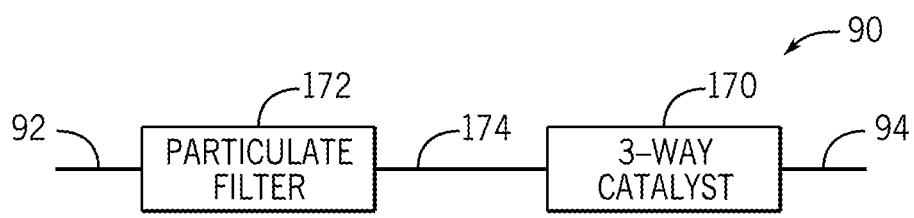

In some embodiments, e.g., as shown in FIG. 4A, the exhaust gases in the aftertreatment passageway 92 are passed through the particulate filter 172 before being passed through the three-way catalyst 170 and are then vented through the exhaust vent 94. The configuration shown in FIG. 4 in which the 3-way catalyst 170 is upstream of the particulate filter 172 may be utilized if the aftertreatment flow line 174 is sufficiently long that exhaust gases traveling therethrough may lose heat and such heat loss would affect the operation of the 3-way catalyst 170 if the 3-way catalyst 170 were downstream of the particulate filter 172. Other factors such as an amount of space available for the aftertreatment system 90 may also determine whether the 3-way catalyst 170 is upstream or downstream of the particulate filter 172 as shown in FIG. 4 or 4A, respectively.

Figure 4B:
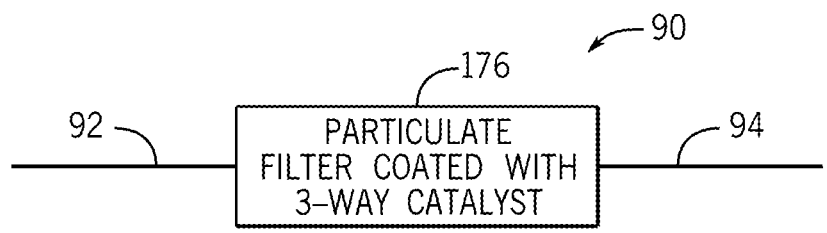
Figure 4C:
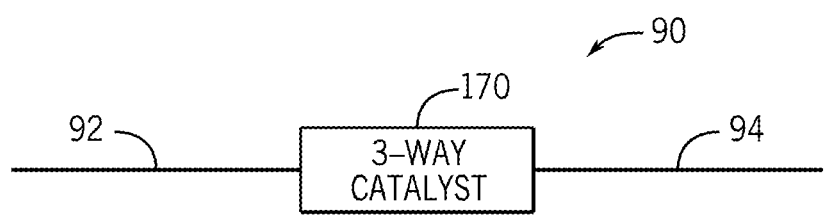

In some embodiments, the aftertreatment system 90 includes only an emission control device 176 comprising a particulate filter coated with a 3-way catalyst (as shown in FIG. 4B) and exhaust gases in the aftertreatment passageway 92 are passed through such emission control device 176 and then vented through the exhaust vent 94. In still other embodiments, the aftertreatment system 90 may include only the three-way catalyst 170 (as shown in FIG. 4C) disposed in the exhaust flow path between the aftertreatment passageway 92 and the exhaust vent 94. For example, the three-way catalyst 170 alone may be sufficient in the aftertreatment system 90 if the high-cetane fuel is one that does not produce significant particulate matter when combusted such as, for example, dimethyl ether.

It should be apparent to one having ordinary skill in the art that other types of oxidation/reduction devices, particulate filters, or a combination thereof may be used. Note, that none of the configurations disclosed herein requires the use of an emission control device such as a selective catalytic reduction device (SCR), an ammonia oxidation catalyst, a catalytic reductant injection device (e.g., a diesel exhaust fluid injector), and the like as are used in conventional lean burn engine systems that combust high-cetane fuel exclusively. Thus, space, complexity, and cost requirements of the aftertreatment system 90 may be less than those of an aftertreatment system used in conventional diesel engine systems.

Figure 5:
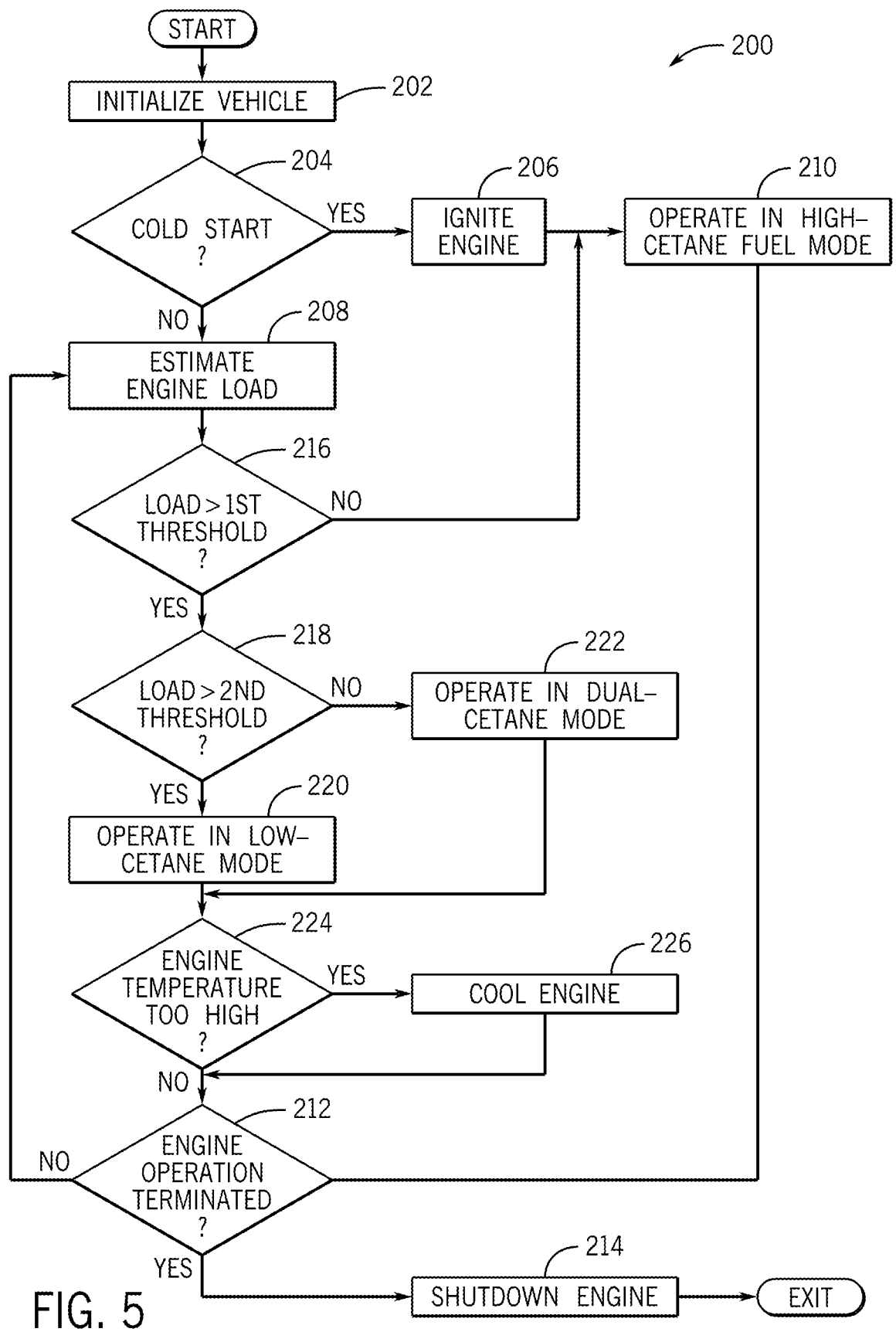
FIG. 5 is a flowchart of processing undertaken by an engine control unit of the dual-fuel engine system of FIG. 2.

FIG. 5 is a flowchart 200 of operation of the dual-fuel engine system 18. Referring to FIGS. 1-5, at step 202 the ECU 152 receives data or a signal from the supervisory controller 150 that the operator has turned on the work vehicle 10 and the ECU 152 initialize the components of the engine 50, the engine speed sensor 132, the one or more air intake sensors 134, and the one or more exhaust sensors 136.

At step 204, the ECU 152 determines if the engine 50 is being cold-started and if so proceeds to step 206. Otherwise, the ECU 152 proceeds to step 208.

At step 206, the ECU 152 ignites the engine 50. Thereafter, at step 210, the ECU 152 causes the engine 50 to operate in the high-cetane fuel mode by operating the fuel injector assemblies 116 to deliver to corresponding combustion chambers 56 only the high-cetane fuel from the first fuel source 112. Thereafter, ECU 152 checks at step 212 if the supervisory controller 150 has received an indication that the operator has turned off the work vehicle 10. If such indication has been received, the ECU 152 terminates operation of the engine 50 at step 214 and exits. Otherwise, the ECU 152 proceeds to step 208.

The ECU 152 develops an estimate of the engine load at step 208. At step 216, the ECU 152 checks if the engine load exceeds the first predetermined threshold and if so proceeds to step 218. Otherwise, the ECU 152 proceeds to step 210 and causes the engine 50 to operate in the high-cetane fuel mode. At step 218, the ECU 152 determines if the engine load exceeds the second predetermined threshold and if so proceeds to step 220. Otherwise, at step 222, the ECU 152 causes the engine 50 to operate in the dual-fuel mode by operating the fuel injector assemblies 116 to deliver a relatively small amount of the high-cetane fuel from the first fuel source 112 and a larger amount of the low-cetane fuel from the second fuel source 114 to the combustion chambers 56 as described above. The ECU 152 may select the ratio of the amount of high-cetane fuel to the amount of low-cetane fuel delivered to the combustion chambers 56 in accordance with the engine load estimated at step 208. Further, the ECU 152 selects such ratio in accordance with the combustion properties of the high-cetane fuel being used so that stable dual-fuel combustion in the engine 50 is achieved. For example, in some embodiments between approximately 90% and 95% of the total fuel delivered to the engine 50 is the low-cetane fuel when the engine 50 is operated in the dual-fuel mode if the high-cetane fuel is diesel. In other embodiments, the low-cetane fuel may comprise a smaller portion of the total fuel delivered to the engine 50 if, for example, the high-cetane fuel is dimethyl ether or (diethyl) ether.

If at step 218, the ECU 152 determines the engine load is greater than the second predetermined threshold, the ECU 152, at step 220, causes the engine 50 to operate in the low-cetane fuel mode by operating the fuel injector assemblies 116 to deliver to the combustion chambers 56 only the low-cetane fuel from the second fuel source 114 via the second fuel supply line 120.

After steps 220 and 222, the ECU 152 determines at step 224 if the temperature of the engine 50 indicates the engine is at risk for thermal overload, e.g., by checking the temperature of the exhaust gases generated by the engine 50 and measured by the one or more exhaust sensors 136. If the engine 50 is at risk for thermal overload, the ECU 152 proceeds to step 226, otherwise the ECU 152 proceeds to step 212 described above.

At step 226, the ECU 152 reduces the temperature of the engine 50 by operating the EGR valve 102 to increase the amount of cooled recirculated exhaust gases from the EGR system 96 into the mixer 104 and thereby reduce the temperature of the air supplied to the engine 50, by operating the non-combustible fuel injector 122 to add the non-combustible fuel into the low-cetane fuel supplied to the engine 50, or a combination thereof. The temperature of the exhaust generated by the engine 50 may provide an indication of the temperature of the engine 50 and the ECU 152 may determine the amount of EGR gases to mix with the air and the amount of the non-combustible fuel to inject into the low-cetane fuel in accordance with such temperature. as measured by the exhaust sensors 136. For example, adding the non-combustible fluid to the low-cetane fuel may reduce the temperature of the engine 50 faster than increasing the amount of EGR gases mixed with the drawn air. After step 226, the ECU 152 proceeds to step 212 described above.

Although the embodiments disclosed herein are described in connection with a vehicle having an engine system comprising a compression engine, it should be apparent to one who has ordinary skill in the art that aspects of these embodiments may be adapted to other types of work vehicles having other types of engines to utilize multiple fuel types. Further, aspects of such embodiments may even be used in other types of engines or motors not associated with vehicles as appropriate.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A dual-fuel engine system for a work vehicle, comprising
   an engine being a compression ignition engine with a piston-cylinder arrangement defining a combustion chamber;
   an engine control unit (ECU) having a processing and memory architecture configured to execute instructions to deliver to the engine only a first fuel when an operating load of the engine is less than a first predetermined threshold, deliver only a second fuel and operate the engine stoichiometrically when the operating load is greater than a second predetermined threshold, wherein the second predetermined threshold is greater than the first predetermined threshold; and
   an aftertreatment system disposed in an exhaust flow path between the engine and an exhaust vent, wherein the exhaust flow path is free of any injected catalytic reductant.

2. The dual-fuel engine system of claim 1, wherein the ECU delivers a combination of both the first fuel and the second fuel when the operating load is between the first predetermined threshold and the second predetermined threshold.

3. The dual-fuel engine system of claim 1, wherein the aftertreatment system comprises one or both of a three-way catalyst and a particulate filter.

4. The dual-fuel engine system of claim 3, wherein the exhaust flow path is free of a selective catalytic reduction device.

5. The dual-fuel engine system of claim 1, further including fuel injector assemblies, wherein the ECU selectively operates the fuel injector assemblies to deliver only the first fuel, the second fuel, or both the first and the second fuels to the engine.

6. The dual-fuel engine system of claim 5, wherein when the operating load is greater than the second predetermined threshold, the ECU operates a fluid injection device to add a non-combustible fluid to the second fuel and operates the fuel injector assemblies to deliver a mixture of the non-combustible fluid and the second fuel to the combustion chambers of the engine.

7. The dual-fuel engine system of claim 5, wherein the non-combustible fluid comprises water.

8. The dual-engine system of claim 1, wherein the first fuel is one of biodiesel, renewable diesel, dimethyl ether, ether, or fossil diesel.

9. The dual-engine system of claim 1, wherein the second fuel is an alcohol based or an alcohol diluted with water.

10. An engine control unit (ECU) for a work vehicle having a dual-fuel engine system having an engine being a compression ignition engine comprising a piston-cylinder arrangement defining a combustion chamber and an aftertreatment system disposed in an exhaust flow path between the engine and an exhaust vent of the work vehicle, the ECU comprising:
    a controller having a processing and memory architecture configured to execute instructions according to an operating load of the engine to deliver to the engine only a first fuel when the operating load is less than a first predetermined threshold, deliver to the engine only a second fuel and operate the engine stoichiometrically when the operating load is greater than a second predetermined threshold, wherein the second predetermined threshold is greater than the first predetermined threshold;
    wherein the exhaust flow path is free of any injected catalytic reductant.

11. The ECU of claim 10, wherein the controller delivers to the engine a combination of both the first fuel and the second fuel when the operating load is intermediate the first predetermined threshold and the second predetermined threshold.

12. The ECU of claim 10, wherein a cetane value of the first fuel is greater than a cetane value of the second fuel.

13. The ECU of claim 10, wherein the aftertreatment system comprises one or both of a three-way catalyst and a particulate filter.

14. The ECU of claim 13, wherein the exhaust flow path is free of a selective catalytic reduction device.

15. The ECU of claim 10, further including fuel injector assemblies, wherein the ECU selectively operates the fuel injector assemblies to deliver only the first fuel, the second fuel, or the first and the second fuels to the engine.

16. The ECU of claim 15, wherein when the engine load is greater than the predetermined threshold, the ECU operates a fluid injection device to add a non-combustible fluid to the second fuel and operates fuel injector assemblies to deliver a mixture of non-combustible fluid and the second fuel to the engine.

17. The ECU of claim 10, wherein the first fuel is one of biodiesel, renewable diesel, dimethyl ether, ether, or fossil diesel.

18. The ECU of claim 10, wherein the second fuel is an alcohol or an alcohol diluted with water.

\* \* \* \* \*